(12) United States Patent
Sasaki et al.

(10) Patent No.: US 6,168,856 B1
(45) Date of Patent: Jan. 2, 2001

(54) MAGNETIC RECORDING MEDIUM

(75) Inventors: Hideki Sasaki; Naoyuki Nagashima; Masatoshi Uchida; Shigeyo Miyamori, all of Tokyo (JP)

(73) Assignee: TDK Corporation, Tokyo (JP)

( * ) Notice: Under 35 U.S.C. 154(b), the term of this patent shall be extended for 0 days.

(21) Appl. No.: 09/276,487

(22) Filed: Mar. 25, 1999

(30) Foreign Application Priority Data

Mar. 31, 1998 (JP) .................................................. 10-085336

(51) Int. Cl.$^7$ ....................................................... G11B 5/73
(52) U.S. Cl. ...................... 428/216; 428/425.9; 428/522; 428/694 BG; 428/694 BU; 428/694 BS; 428/900
(58) Field of Search ................................. 428/216, 425.9, 428/522, 694 BG, 694 BU, 694 BS, 900

(56) References Cited

U.S. PATENT DOCUMENTS

| 5,443,913 | 8/1995 | Kohno et al. ................... 428/425.9 |
| 5,503,938 | * 4/1996 | Arudi ............................. 428/423.1 |
| 5,688,591 | 11/1997 | Kuwajima et al. .................. 428/323 |

FOREIGN PATENT DOCUMENTS

| 63-191315 | 8/1988 | (JP) . |
| 63-191318 | 8/1988 | (JP) . |
| 6-259751 | 9/1994 | (JP) . |
| 8-17035 | 1/1996 | (JP) . |
| 9-265623 | 10/1997 | (JP) . |

* cited by examiner

*Primary Examiner*—Stevan A. Resan
(74) *Attorney, Agent, or Firm*—Oblon, Spivak, McClelland, Maier & Neustadt, P.C.

(57) ABSTRACT

Disclosed is a magnetic recording medium excellent in surface properties, good in electromagnetic characteristics, and excellent in durability, which comprises a non-magnetic support and a magnetic layer formed thereon through a non-magnetic layer, in which the non-magnetic layer contains, as binders, a vinyl chloride resin having carboxylic acid and amine polar groups, and a polyurethane resin having phosphobetaine and/or phosphamine as a polar group.

6 Claims, 1 Drawing Sheet

MAGNETIC RECORDING MEDIUM

FIELD OF THE INVENTION

The present invention relates to a magnetic recording medium, and particularly to a magnetic recording medium improved in electromagnetic characteristics and durability.

BACKGROUND OF THE INVENTION

In recent years, for avoiding deterioration of signals caused by repeated copies, digitization of magnetic recording media has proceeded. Further, the recording density thereof has also been desired to be increased, because of an increase in the amount of recording data.

As magnetic powders, therefore, finer magnetic metal powders or hexagonal tabular barium ferrite having high saturation magnetic flux density have been used.

On the other hand, for increasing the recording density, it is necessary to consider the thickness loss and the self-demagnetization loss of the media, and from such a viewpoint, it has been desired to make magnetic layers thinner.

However, when the magnetic layers are made thinner, the surface properties of supports are reflected in surfaces of the magnetic layers to deteriorate the electromagnetic characteristics in some cases. It has therefore been proposed that non-magnetic layers, for example, using thermosetting resins as undercoats, are formed on the surfaces of the support, and the magnetic layers are formed thereon. However, such non-magnetic layers have the problem of insufficient durability.

Further, when the non-magnetic layers and the magnetic layers are coated, the non-magnetic layers are once formed by coating and drying, and then, the magnetic layers are formed. Accordingly, depending on the resins used, the problem arises that the surface properties of the magnetic layers deteriorates.

From such circumstances, JP-A-63-191315 (the term "JP-A" as used herein means an "unexamined published Japanese patent application") and JP-A-63-191318 disclose a method of coating a non-magnetic lower layer in which, for example, a non-magnetic powder is dispersed in a plastic resin binder, and applying coating solutions for the lower layer and the magnetic layer in multiple layers in a wet state, thereby improving the electromagnetic characteristics, the durability and the head wear resistance.

Further, for improving the surface properties, in JP-A-6-259751, granular α-iron oxide/carbon black are used as inorganic pigments to form a non-magnetic lower layer, and coating is conducted by the above-mentioned production method. The use of granular α-iron oxide provides the effect of improving the surface properties compared with needle-like α-iron oxide and materials such as titanium oxide even if they are granular.

On the other hand, with respect to binders used for preparing paints for non-magnetic layers, when a-iron oxide/carbon black pigments are used, JP-A-6-259751 discloses examples in which sulfonic acid group-containing resins are used, JP-A-8-17035 discloses examples in which vinyl chloride resins having amine polar groups alone and urethane resins having sulfonic acid polar groups are used, and JP-A-9-265623 discloses examples of urethane resins having metal salts of sulfamic acid as polar groups, in their examples and claims.

However, in magnetic recording media such as video tapes and floppy disks of the digital recording system, it is increasingly required that the thickness of magnetic layers is made thinner, resulting from an increase in recording density. Accordingly, sufficient dispersion cannot be obtained by the use of only the pigments and binders disclosed in JP-A-6-259751, JP-A-8-17035 and JP-A-9-265623, resulting in insufficient surface properties.

For example, it has hitherto been known that binders having sulfonic acid polar groups well dispersing a-iron oxide and aluminum oxide are poor in dispersibility of carbon black, whereas binders having amine polar groups well dispersing carbon black are poor in dispersibility of iron oxide. Even if vinyl chloride resins having amine polar groups alone and urethane resins having sulfonic acid polar groups are used as described in JP-A-8-17035, mutual defects appear to results in failure to obtain a satisfactory dispersed state. Then, for obtaining desired surface properties, a further improvement in a dispersion level has been required.

SUMMARY OF THE INVENTION

It is therefore an object of the present invention to provide a magnetic recording medium excellent in surface properties, good in electromagnetic characteristics and excellent in durability by improving the dispersibility of all pigments different in properties from one another such as α-iron oxide, carbon black and aluminum oxide.

As a result of intensive investigation for attaining the above-mentioned object, the present inventors have discovered that a vinyl chloride resin having an amine polar group and a carboxylic acid polar group in the same molecule, and a polyurethane resin having phosphobetaine and/or phosphamine as a polar group can improve the dispersibility of all of α-iron oxide, aluminum oxide and carbon black contained therein, and that the combination of these two resins can further provide a magnetic recording medium having smooth surface properties, excellent durability and electromagnetic characteristics which have hitherto been very difficult to be achieved, thus completing the present invention.

That is to say, the present invention provides:

(1) A magnetic recording medium comprising a non-magnetic support, a non-magnetic layer formed on the support and a magnetic layer formed thereon, in which said non-magnetic layer contains, as binders, a vinyl chloride resin having carboxylic acid and amine polar groups, and a polyurethane resin having phosphobetaine and/or phosphamine as a polar group;

(2) The magnetic recording medium described in the above (1), in which the non-magnetic layer contains granular α-$Fe_2O_3$ and carbon black having a BET of 60 $m^2/g$ to 250 $m^2/g$ and a DBP oil absorption of 40 ml/100 g to 150 ml/100 g as pigments;

(3) The magnetic recording medium described in the above (1), in which the non-magnetic layer contains granular α-$Fe_2O_3$, α-$Al_2O_3$ and carbon black having a BET of 60 $m^2/g$ to 250 $m^2/g$ and a DBP oil absorption of 40 ml/100 g to 150 ml/100 g as pigments;

(4) The magnetic recording medium described in the above (1), in which a magnetic powder contained in the magnetic layer is a magnetic metal powder or a hexagonal ferromagnetic powder;

(5) The magnetic recording medium described in the above (1), in which the average thickness of the magnetic layer is 1.0 $\mu$m or less, and the average thickness of the non-magnetic layer is 1 $\mu$m to 3 $\mu$m;

(6) The magnetic recording medium described in the above (1) or (5), in which the non-magnetic layer is formed, and the magnetic layer is formed thereon in multiple layers simultaneously or successively while the non-magnetic layer is still in a wet state;

(7) The magnetic recording medium described in the above (1), in which the amount of the carboxylic acid polar group contained in the vinyl chloride resin is 0.1% to 2.0% by weight;

(8) The magnetic recording medium described in the above (1), in which the amount of the amine polar group contained in the vinyl chloride resin is 50 ppm or more;

(9) The magnetic recording medium described in the above (1), in which the average polymerization degree ranges from 100 to 700;

(10) The magnetic recording medium described in the above (1), in which the number average molecular weight of the polyurethane resin ranges from 5,000 to 200,000;

(11) The magnetic recording medium described in the above (1), in which the weight ratio of the vinyl chloride resin to the polyurethane resin is from 9/1 to 5/5;

(12) The magnetic recording medium described in the above (2) or (3), in which the particle size of granular $\alpha$-$Fe_2O_3$ is 100 nm or less;

(13) The magnetic recording medium described in the above (2) or (3), in which the amount of carbon black added is from 20 parts to 80 parts by weight based on 100 parts by weight of granular $\alpha$-$Fe_2O_3$; and

(14) The magnetic recording medium described in the above (3), in which the amount of $\alpha$-$Fe_2O_3$ added is from 10 parts to 40 parts by weight based on 100 parts by weight of the sum of $\alpha$-$Fe_2O_3$ and carbon black.

DESCRIPTION OF THE PREFERRED EMBODIMENTS

Figure 1:
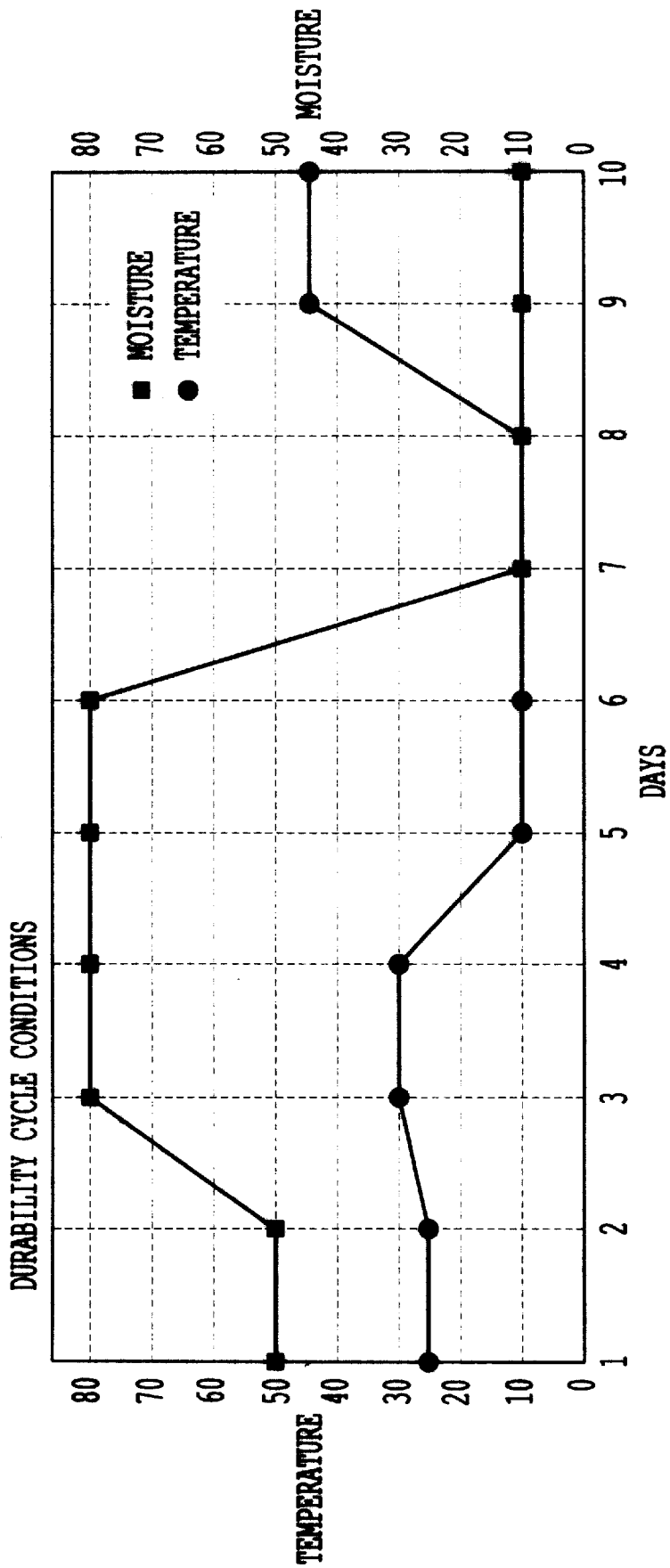
FIG. 1 is a graph showing durability cycle conditions in measuring the durability.

The specific constitution of the present invention will be described in detail below.

The vinyl chloride resin which is one of the binders of the present invention preferably has a vinyl chloride content of 60% to 95%. Such vinyl chloride resins include vinyl chloride-vinyl acetate-vinyl alcohol copolymers, vinyl chloride-hydroxyalkyl (meth)acrylate copolymers, vinyl chloride-vinyl acetate-maleic acid copolymers, vinyl chloride-vinyl acetate-vinyl alcohol-maleic acid copolymers and vinyl chloride-hydroxyalkyl (meth)acrylate-maleic acid copolymers. Further, in the present invention, it is necessary to contain a carboxylic acid which disperses well $\alpha$-iron oxide and aluminum oxide and an amine polar group which disperses well carbon black together in one molecular as components of the above-mentioned vinyl chloride resin. When the vinyl chloride resin has no carboxylic acid, the stability of a paint becomes poor, and the surface properties in coating in multiple layers deteriorate. When it has no amine polar group, the dispersibility of carbon black is poor, resulting in failure to obtain satisfactory surface properties. Introduction of the carboxylic acids can be carried out by copolymerization of polymerization monomers such as maleic acid, maleic anhydride and acrylic acid with other polymerization monomers. Maleic anhydride is preferred among others. The amine polar groups can be introduced by adding amine compounds to the vinyl chloride copolymers to react them with each other. As the amine compounds, primary, secondary and tertiary amines such as aliphatic, alicyclic and aromatic amines are used. Examples thereof include ethylamine, ethanolamine, diethylamine, diethanolamine, and dimethylethanolamine and diethylethanolamine. Dimethylethanolamine is preferred among others.

The amount of the carboxylic acid contained in the vinyl chloride resin ranges from 0.1% to 2.0% by weight, and more preferably from 0.2% to 1.0% by weight. Less than 0.1% by weight results in the tendency of an insufficient effect to be observed in the dispersibility, whereas exceeding 2.0% by weight is liable to increase the viscosity of a paint to deteriorate the dispersibility and the coating suitability. Similarly, the amount of the amine polar group is required to be 50 ppm or more, preferably 100 ppm or more. Less than 50 ppm results in the tendency of an insufficient effect to be observed in the dispersibility. The average polymerization degree of the vinyl chloride resin is preferably within the range of 100 to 700, and more preferably within the range of 200 to 500. Less than 100 results in a reduction in the strength of a coated film to adversely affect the durability, whereas exceeding 700 lead to an increase in viscosity of the paint, which causes insufficient dispersion.

Further, the polyurethane resin is required to have phosphobetaine or phosphamine as the polar group, which has both the properties of the phosphoric acid family which disperses well $\alpha$-iron oxide and aluminum oxide and the properties of the amine family which disperses well carbon black. Both may be contained as a mixture or alone. Phosphobetaine is an inner salt which comprises an ammonium salt as a cationic ion and an anionic ion from phosphonic acid, phosphinic acid or acid phosphate compounds, and phosphamine is an amide substitute of phosphonic acid, phosphinic acid or acid phosphate compounds. When the polyurethane resin does not have simultaneously both of the phosphoric acid polar group and the amine polar group in one polar group unlike phosphobetaine and phosphamine, the dispersion becomes poor to deteriorate the surface properties in coating in multiple layers, resulting in the failure to achieve the object of the present invention. Although the polyurethane resins used in the present invention are synthesized by the reaction of polyols of high molecular weight and polyisocyanates and further other copolymers if necessary, similarly to usual methods for synthesizing polyurethanes, these polar groups may be contained in either the polyol components or the polyisocyanate components. Further, the polar groups may be introduced into the polymers as polymer reaction components. However, considering unreacted components and the rate of introduction, the reaction is rather easily controlled when the polymerization monomers contain the polar groups. The polymerization monomers are synthesized by the reaction of aminodiols with phosphonic acid derivatives, phosphinic acid derivatives or acid phosphates. A structural formula of the monomers are as follows:

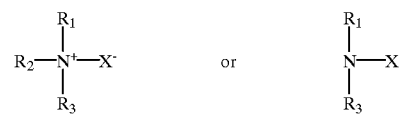

wherein $R_1$ and $R_3$ are constituents of the diol and $R_2$ represents a phenyl group, an alkyl group or an alkylphenyl group of 1 to 40 of carbon atoms, and X is a residue of the phosphonic acid, the phosphinic acid or the acid phosphate. Examples of the aminodiols include, but are not limited to N-methyldiethanolamine, N-ethyldiethanol-amine, N-phenyldiethanolamine and diethanolamine. On the other hand, examples of phosphonic acid derivatives include, but are not limited to methylphosphonic acid, ethylphosphonic acid, phenylphosphonic acid, metylenediphosphonic acid and octadecylphosphonic acid, examples of phosphinic acid derivatives include phenylphosphinic acid, diphenylphosphinic acid and dimethylphosphinic acid, and examples of the acid phosphates include amyl acid phosphate, 2-ethylhexyl acid phosphate, methyl acid phosphate, ethyl acid phosphate and polyoxyethylene nonylphenyl ether phosphate. A polymerization monomer obtained by the reaction of N-methyldiethanolamine with phenylphosphonic acid, octadecylphosphonic acid, methyl acid phosphate or polyoxyethylene nonylphenyl ether phosphate is preferably used among others. The amount of the polar group is preferably within the range of 0.01 mmol/g to 1.0 mmol/g, and more preferably within the range of 0.03 mmol/g to 0.5 mmol/g. If the amount of the polar group is less than 0.01 mmol/g, an insufficient effect tends to be observed in the dispersibility. On the other hand, if it exceeds 1.0 mmol/g, intermolecular or intramolecular coagulation is liable to occur to adversely affect the dispersibility, resulting in difficulty in obtaining the effect of the present invention. The number average molecular weight of the polyurethane resin is preferably within the range of 5,000 to 200,000, and more preferably within the range of 10,000 to 100,000. Less than 5,000 results in a reduction in the strength of a coated film to adversely affect the durability, whereas exceeding 200,000 lead to the possibility of generation of inconvenience in respect to the production of paints and coating procedures.

The above-described polyurethane resins and vinyl chloride resins can be thermoplastic resins, thermosetting or thermoreactive resin, electron beam (EB) sensitive modified resin and etc. Resins which have hydroxyl group(s) at a terminus or a side chain thereof are especially preferred because they may easily use a cross-linking reaction by an isocyanate. Hardners for cross-linking the resins by an isocyanate include Coronate L, HL, 3041 (manufactured by Nippon Polyurethane Co., Ltd.), 24A-100, TPI-100 (manufactured by Asahi Chemical Industries, Ltd.). Resins which are used in the present invention are crosslinking (thermosetting) resins having the above-described hydroxyl group(s).

The most preferred mode of the present invention is to use the vinyl chloride resin having at least the carboxylic acid and the amine polar group, and the polyurethane resin having phosphobetaine and/or phosphamine as the polar group at the same time in the lower non-magnetic layer. When the vinyl chloride resin and the polyurethane resin are used as a mixture, the vinyl chloride/polyurethane weight ratio is from 9/1 to 5/5, and preferably from 8/2 to 6/4. If this ratio is higher than 9/1, a coated film tends to become brittle. On the other hand, this ratio is lower than 5/5, a coated film tends to become soft, resulting in deterioration of the durability. Further, a polyurethane resin having another polar group may be used in combination as so required. In that case, the content of the polyurethane resin containing phosphobetaine or phosphamine as the polar group is preferably 10% to 50% of the total resin components. The use of these resins results in good dispersion to obtain a coated film having good surface properties.

The lower non-magnetic layers of the present invention preferably contain non-magnetic pigments. In particular, it is preferred that granular $\alpha$-$Fe_2O_3$ having an aspect ratio of 1 to 2 and carbon black having a BET value of 60 $m^2$/g to 250 $m^2$/g and a DBP oil absorption of 40 ml/100 g to 150 ml/100 g are used as a mixture.

The use of granular $\alpha$-$Fe_2O_3$ allows high dispersibility and an increased filling rate of ultrafine particles in the non-magnetic layers. Accordingly, the surface properties of the non-magnetic layers are improved, and the surface properties of the magnetic layers are improved as well. Needle $\alpha$-$Fe_2O_3$ makes it difficult to obtain this effect.

Further, the use of granular $\alpha$-$Fe_2O_3$ in combination with carbon black having a BET value of 60 $m^2$/g to 250 $m^2$/g and a DBP oil absorption of 40 ml/100 g to 150 ml/100 g can give suitable thixotropy to the paints, as well as a reduction in electric resistance. If the BET value is less than 60, the thixotropy of the paints is insufficient to be adversely affected in coating. On the other hand, if the BET value exceeds 250, the dispersibility deteriorate to exert an adverse effect on the filling property in the non-magnetic layers. As to the DBP oil absorption, similarly, less than 40 ml/100 g results in increased electric resistance of the coated films, whereas exceeding 150 ml/100 g leads to poor dispersibility. Such carbon black includes products having trade names #45B, MA8B, MA100B and 3150B (manufactured by Mitsubishi Chemical Corporation), Raven 760, Raven 1040, Raven 1060 and Conductex SC (manufactured by Colombian Carbon Co.)

The carbon black is preferably added in an amount of 20 parts to 80 parts by weight based on 100 parts by weight of $\alpha$-$Fe_2O_3$ described above. Less than 20 parts by weight results in an increased electric resistance value and in too low thixotropy of the paints, whereas exceeding to 80 parts by weight causes too high thixotropy of the paints, thereby exerting an adverse effect on the coating properties.

The particle size of $\alpha$-$Fe_2O_3$ described above is preferably 100 nm or less, and more preferably 80 nm or less. The average particle size of $\alpha$-$Fe_2O_3$ is 20 nm to 80 nm. Exceeds 100 nm results in an adverse effect on the surface properties of the non-magnetic layers. The form is approximately spherical, and the aspect ratio which is a value of the average major axis length divided by the average minor axis length is about 1 to about 2. The specific surface area determined by the BET method is from 20 $m^2$/g to 80 $m^2$/g, and preferably from 30 $m^2$/g to 60 $m^2$/g. Such granular $\alpha$-$Fe_2O_3$ is commercially available, and a commercial product may be used as it is. Such products include Nanotite (manufactured by Showa Denko K. K.) and FRO (manufactured by Sakai Chemical Industry Co., Ltd.) As the non-magnetic pigments, known pigments such as carbon graphite, $Cr_2O_3$ and $TiO_2$ may be further used in combination.

In particular, the use of $\alpha$-$Al_2O_3$ in combination enhances the strength of the coated films, and a further improvement in durability can be expected. It is desirable that the amount thereof added is from 10 parts to 40 parts by weight based on 100 parts by weight of the sum of $\alpha$-$Fe_2O_3$ and carbon black. Less than 10 parts by weight results in insufficient exhibition of the reinforcing effect, whereas exceeding 40 parts by weight leads to deterioration of the surface properties of the non-magnetic layers. The particle size thereof is more preferably from 0.1 $\mu$m to 0.5 $\mu$m. Such $\alpha$-$Al_2O_3$ includes trade names AKP20, AKP30, HIT50 and HIT60 (manufactured by Sumitomo Chemical Co., Ltd.).

As ferromagnetic powders used in the magnetic layers of the present invention, known materials can be used. Examples thereof include magnetic oxide powders such as $\gamma$-$Fe_2O_3$, Co-containing $\gamma$-$Fe_2O_3$, $Fe_3O_4$, Co-containing $\gamma$-$Fe_3O_4$, $CrO_2$, barium ferrite and strontium ferrite, and magnetic metal powders such as metals, for example, Fe, Co and Ni, and alloys thereof.

These ferromagnetic powders may be selected depending on the medium species to be applied. Of these, fine hexagonal oxide powders such as barium ferrite and strontium ferrite, and magnetic metal powders such as metals, for example, Fe, Co and Ni, or alloys thereof are preferred. Further, the ferromagnetic powders containing rare earth elements including Y as additive elements are also preferred.

The Hc thereof is preferably within the range of 1,300 Oe to 2,800 Oe, adjusting it to a drive system in existence or under development.

As to a construction of the coated film of the present invention, the non-magnetic layer is formed on the non-magnetic support, and the magnetic layer is formed on the non-magnetic layer. With the progress of high density recording, the thickness of the magnetic layer becomes thinner. In particular, at an average thickness of 1 $\mu$m or less suitable for high density recording, the surface properties of a base film affect the surface properties of a coated film, and the absolute amount of a lubricant is decreased to deteriorate the durability. Accordingly, the magnetic layer is preferably formed on a lubricant-containing non-magnetic layer which is formed on the non-magnetic support. At this time, the average thickness of the non-magnetic layer is preferably between 1 $\mu$m and 3 $\mu$m. Thinner than 1 $\mu$m results in a decreased effect as the non-magnetic layer, whereas exceeding 3 $\mu$m causes poor coating properties in coating to provide unfavorable productivity. The average thickness is obtained as an average value of measured thickness at five points.

Methods for forming the above-mentioned magnetic layer and non-magnetic layer may be either wet-on-wet coating in which the magnetic layer is simultaneously formed on the non-magnetic layer while the non-magnetic layer is still in a wet state, or wet-on-dry coating in which the non-magnetic layer is formed, and after it has been dried, the magnetic layer is formed thereon. However, considering the production efficiency, the wet-on wet coating is preferred in which the paints can be concurrently applied in two layers at one coater portion. Further, in the wet-on-wet coating, the magnetic layer may be formed after the non-magnetic layer has been formed, or both layers may be simultaneously formed.

There is no particular limitation on coaters used in such coating processes. In coating of the magnetic layer in multiple layers by the wet-on-dry processes, a gravure coater, a reverse roll coater or a die nozzle coater can be used.

Further, in coating in multiple layers by the wet-on-wet processes, a gravure coater, reverse roll coater or die nozzle coater is preferably used for the lowermost layer, and a die nozzle coater is preferably used for other layers. When the die nozzle coater is used, either a coater having a plurality of coating nozzles or a plurality of coaters each having one coating nozzle may be used.

EXAMPLE 1

<Paint 1 for Lower Layer>

| | |
|---|---|
| Granular $\alpha$-Fe$_2$O$_3$ (FRO-3, manufactured by Sakai Chemical Industry Co., Ltd.) (average particle size: 30 nm, BET = 45 m$^2$/g) | 65 parts by weight |
| Carbon black (#45B, manufactured by Mitsubishi Chemical Corporation) (average particle size: 24 nm, BET: 125 m$^2$/g, DBP oil absorption: 47 ml/100 g) | 35 parts by weight |

-continued

<Paint 1 for Lower Layer>

| | |
|---|---|
| Vinyl chloride-vinyl acetate copolymer (SOLBIN MK6, manufactured by Nisshin Kagaku Kogyo Co., Ltd.) (polymerization degree: 350, polar groups: carboxylic acid = 0.5% and N content of ammonium salt 300 ppm) | 15 parts by weight |
| Phosphobetaine-containing polyurethane resin which comprises phosphobetaine as polar groups obtained by a reaction of N-methyldietanolamine and phenylphosphonic acid (Mw = 40,000, polar group concentration: 1.5 groups/molecule | 5 parts by weight |
| —SO$_3$Na-containing polyurethane resin (Mn = 25,000, polar group concentration: 1 group/molecule) | 3 parts by weight |
| Isocetyl stearate | 10 parts by weight |
| Butyl stearate | 4 parts by weight |
| Sorbitan monostearate | 3 parts by weight |
| MEK | 150 parts by weight |
| Toluene | 50 parts by weight |
| Cyclohexanone | 50 parts by weight |

The above-mentioned composition was kneaded, and then, dispersed in a sand grinder mill to prepare the paint 1 for a lower layer.

<Magnetic Paint 1 for Upper Layer>

| | |
|---|---|
| Magnetic metal powder (Hc = 1,660 Oe, $\sigma$S = 126 emu, BET = 58 m$^2$/g, average length of major axis: 0.33 $\mu$m, Fe/Co/Ni = 100/5/5 containing Al and Si as additive elements) | 100 parts by weight |
| Vinyl chloride copolymer (MR110, manufactured by Nippon Zeon Co., Ltd.) (polymerization degree: 300, polar group: —OSO$_3$K = 1.5 groups/molecule) | 14 parts by weight |
| Phosphobetaine-containing polyurethane resin which comprises phosphobetaine as polar groups obtained by a reaction of N-methyl-dietanolamine and phenylphosphonic acid (Mw = 40,000, polar group concentration: 1.5 groups/molecule | 4 parts by weight |
| —SO$_3$Na-containing polyurethane resin (Mn = 25,000, polar group concentration: 1 group/molecule) | 2 parts by weight |
| $\alpha$-Al$_2$O$_3$ (AKP30, manufactured by Sumitomo Chemical Co., Ltd.) (average particle size: 0.33 $\mu$m, BET: 8 m$^2$/g) | 10 parts by weight |
| Cr$_2$O$_3$ (S-1, manufactured by Nippon Industrial Chemical Co., Ltd.) (average particle size: 0.40 $\mu$m, BET: 3 m$^2$/g) | 5 parts by weight |
| Carbon black (Sevacurve MT manufactured by Colombian Carbon Co.) (average particle size: 350 nm, BET: 7 m$^2$/g, DBP oil absorption: 41 ml/100 g) | 3 parts by weight |
| Sorbitan monostearate | 3 parts by weight |
| Isocetyl stearate | 3 parts by weight |
| Butyl stearate | 2 parts by weight |
| MEK | 250 parts by weight |
| Toluene | 80 parts by weight |
| Cyclohexanone | 80 parts by weight |

The above-mentioned composition was kneaded, and then, dispersed in a sand grinder mill to prepare magnetic paint 1 for an upper layer.

Then, 4 parts by weight of Coronate L (manufactured by Nippon Polyurethane Co., Ltd.) was added to the paint 1 for the lower layer, and similarly, 4 parts by weight of Coronate L was added to the magnetic paint 1 for the upper layer. First, the paint 1 for the lower layer was applied to a 62-μm thick PET film having a surface roughness (Ra) of 9 nm so as to give a thickness of 1.5 μm (dry film thickness) by the extrusion die nozzle process, and subsequently, the magnetic paint 1 for the upper layer was applied so as to give a thickness of 0.3 μm (dry film thickness) by the extrusion die nozzle process, while the paint 1 for the lower layer was still in a wet state, followed by non-orientation with a non-orientation magnet. After drying at a drying temperature of 100° C., calendaring treatment was carried out at a linear pressure of 300 kg/cm at a temperature of 60° C. to form a coated film on one side of the support. Then, in a similar procedure, a coated film was formed on the other side of the support to prepare a raw sheet roll having magnetic layers on both side.

Finally, this raw sheet roll was stamped out in a disk form, followed by thermosetting at 70° C. for 24 hours to prepare a disk.

EXAMPLE 2

<Paint 2 for Lower Layer>

| | |
|---|---|
| Granular α-Fe$_2$O$_3$ (FRO-3, manufactured by Sakai Chemical Industry Co., Ltd.) (average particle size: 30 nm, BET 45 m$^2$/g) | 55 parts by weight |
| Carbon black (#45B, manufactured by Mitsubishi Chemical Corporation) (average particle size: 24 nm, BET: 125 m$^2$/g, DBP oil absorption: 47 ml/100 g) | 30 parts by weight |
| α-Al$_2$O$_3$ (AKP30, manufactured by Sumitomo Chemical Co., Ltd.) (average particle size: 0.33 μm, BET: 8 m$^2$/g) | 15 parts by weight |
| Vinyl chloride-vinyl acetate copolymer (SOLBIN MK6, manufactured by Nisshin Kagaku Kogyo Co., Ltd.) (polymerization degree: 350, polar groups: carboxylic acid = 0.5% and N content of ammonium salt = 300 ppm) | 12 parts by weight |
| Phosphobetaine-containing polyurethane resin which comprises phosphobetaine as polar groups obtained by a reaction of N-methyldietanolamine and phenylphosphonic acid (Mw = 40,000, polar group concentration: 15 groups/molecule | 4 parts by weight |
| —SO$_3$Na-containing polyurethane resin (Mn = 25,000, polar group concentration: 1 group/molecule) | 2 parts by weight |
| Isocetyl stearate | 10 parts by weight |
| Butyl stearate | 4 parts by weight |
| Sorbitan monostearate | 3 parts by weight |
| MEK | 150 parts by weight |
| Toluene | 50 parts by weight |
| Cyclohexanone | 50 parts by weight |

The above-mentioned composition was kneaded, and then, dispersed in a sand grinder mill to prepare the paint 2 for a lower layer.

Then, the magnetic paint 1 for the upper layer and the paint 2 for the lower layer were applied by the method described in Example 1 to prepare a disk.

EXAMPLE 3

<Paint 3 for Lower Layer>

| | |
|---|---|
| Granular α-Fe$_2$O$_3$ (FRO-3, manufactured by Sakai Chemical Industry Co., Ltd.) (average particle size: 30 nm, BET = 45 m$^2$/g) | 55 parts by weight |
| Carbon black (#45B, manufactured by Mitsubishi Chemical Corporation) (average particle size: 24 nm, BET: 125 m$^2$/g, DBP oil absorption: 47 ml/100 g) | 30 parts by weight |
| α-Al$_2$O$_3$ (AKP30, manufactured by Sumitomo Chemical Co., Ltd.) (average particle size: 0.33 μm, BET: 8 m$^2$/g) | 15 parts by weight |
| Vinyl chloride-vinyl acetate copolymer (SOLBIN MK6, manufactured by Nisshin Kagaku Kogyo Co., Ltd.) (polymerization degree: 350, polar groups: carboxylic acid = 0.5% and N content of ammonium salt = 300 ppm) | 12 parts by weight |
| Phosphobetaine-containing polyurethane resin which comprises phosphobetaine as polar groups obtained by a reaction of N-methyldietanolamine and phenylphosphonic acid (Mw = 40,000, polar group concentration: 1.5 groups/molecule | 6 parts by weight |
| Isocetyl stearate | 10 parts by weight |
| Butyl stearate | 4 parts by weight |
| Sorbitan monostearate | 3 parts by weight |
| MEK | 150 parts by weight |
| Toluene | 50 parts by weight |
| Cyclohexanone | 50 parts by weight |

The above-mentioned composition was kneaded, and then, dispersed in a sand grinder mill to prepare paint 3 for a lower layer.

Then, the magnetic paint 1 for the upper layer and the paint 3 for the lower layer were applied by the method described in Example 1 to prepare a disk.

EXAMPLE 4

A disk was prepared in the same manner as with Example 2 with the exception that the polar group of the phosphobetaine-containing polyurethane resin used in Example 2 was changed to phosphamine obtained by a reaction of diethanolamine and phenylphosphonic acid.

EXAMPLE 5

A disk was prepared in the same manner as with Example 2 with the exception that the phosphobetaine-containing polyurethane resin used in Example 2 was changed to the polyurethane resin which contains a phosphobetaine obtained by a reaction of N-methyldiethanolamine and phenylphosphonic acid and a phosphamine obtained by a reaction of diethanolamine and phenylphosphonic acid per one molecule of the polyurethane resin.

EXAMPLE 6

<Magnetic Paint 2 for Upper Layer>

| | |
|---|---|
| Barium ferrite magnetic powder (Hc = 2,000 Oe, σS = 56 emu, BET = 43 m$^2$/g, average particle size: 36 nm, average thickness: 11 nm) | 100 parts by weight |

-continued

<Magnetic Paint 2 for Upper Layer>

| | |
|---|---|
| Vinyl chloride copolymer (MR110, manufactured by Nippon Zeon Co., Ltd.) (polymerization degree: 300, polar group: —$OSO_3K$ = 1.5 groups/molecule) | 14 parts by weight |
| Phosphobetaine-containing polyurethane resin which comprises phosphobetaine as polar groups obtained by a reaction of N-methyldietanolamine and phenylphosphonic acid) (Mw = 40,000, polar group concentration: 1.5 groups /molecule) | 4 parts by weight |
| —$SO_3Na$-containing polyurethane resin (Mn = 25,000, polar group concentration: 1 group/molecule) | 2 parts by weight |
| α-$Al_2O_3$ (AKP30, manufactured by Sumitomo Chemical Co., Ltd.) (average particle size: 0.33 μm, BET: 8 $m^2/g$) | 10 parts by weight |
| $Cr_2O_3$ (S-1, manufactured by Nippon Industrial Chemical Co., Ltd.) (average particle size: 0.40 μm, BET: 3 $m^2/g$) | 5 parts by weight |
| Carbon black (Sevacurve MT manufactured by Colombian Carbon Co.) (average particle size: 350 nm, BET: 7 $m^2/g$, DBP oil absorption: 41 ml/100 g) | 3 parts by weight |
| Sorbitan monostearate | 3 parts by weight |
| Isocetyl stearate | 3 parts by weight |
| Butyl stearate | 2 parts by weight |
| MEK | 250 parts by weight |
| Toluene | 80 parts by weight |
| Cyclohexanone | 80 parts by weight |

The above-mentioned composition was kneaded, and then, dispersed in a sand grinder mill to prepare the magnetic paint 2 for an upper layer.

Then, the magnetic paint 2 for the upper layer and the paint 2 for the lower layer were applied by the method described in Example 1 to prepare a disk.

EXAMPLE 7

A disk was prepared in the same manner as with Example 3 with the exception that the vinyl chloride resin/polyurethane resin compounding ratio in the paint for the lower layer of Example 3 was changed from 7/3 to 9/1.

EXAMPLE 8

A disk was prepared in the same manner as with Example 3 with the exception that the vinyl chloride resin/polyurethane resin compounding ratio in the paint for the lower layer of Example 3 was changed from 7/3 to 6/4.

EXAMPLE 9

A disk was prepared in the same manner as with Example 3 with the exception that the vinyl chloride resin/polyurethane resin compounding ratio in the paint for the lower layer of Example 3 was changed from 7/3 to 5/5.

Comparative Example 1

A disk was prepared in the same manner as with Example 2 with the exception that the polar group of the vinyl chloride resin of the paint for the lower layer used in Example 2 was changed to only an ammonium salt.

Comparative Example 2

A disk was prepared in the same manner as with Example 2 with the exception that the polar group of the vinyl chloride resin of the paint for the lower layer used in Example 2 was changed to only a carboxylic acid.

Comparative Example 3

A disk was prepared in the same manner as with Example 2 with the exception that the polar group of the vinyl chloride resin of the paint for the lower layer used in Example 2 was changed to potassium sulfate.

Comparative Example 4

A disk was prepared in the same manner as with Example 2 with the exception that a vinyl chloride resin having no polar group was used as the vinyl chloride resin of the paint for the lower layer used in Example 2.

Comparative Example 5

A disk was prepared in the same manner as with Example 2 with the exception that the polar group of the phosphobetaine-containing polyurethane resin of the paint for the lower layer used in Example 2 was changed to sodium phosphate.

Comparative Example 6

A disk was prepared in the same manner as with Example 2 with the exception that the polar group of the phosphobetaine-containing polyurethane resin of the paint for the lower layer used in Example 2 was changed to sodium sulfamate.

Comparative Example 7

A disk was prepared in the same manner as with Example 2 with the exception that the polar group of the phosphobetaine-containing polyurethane resin of the paint for the lower layer used in Example 2 was changed to sodium sulfonate.

Comparative Example 8

A disk was prepared in the same manner as with Example 2 with the exception that the polar group of the phosphobetaine-containing polyurethane resin of the paint for the lower layer used in Example 2 was changed to an ammonium salt.

Comparative Example 9

A disk was prepared in the same manner as with Example 2 with the exception that the polar group of the phosphobetaine-containing polyurethane resin of the paint for the lower layer used in Example 2 was removed.

Comparative Example 10

A disk was prepared in the same manner as with Example 6 with the exception that the polar group of the hosphobetaine-containing polyurethane resin of the paint or the lower layer used in Example 6 was changed to sodium phosphate.

Comparative Example 11

A disk was prepared in the same manner as with Example with the exception that the polar group of the 6 phosphobetaine-containing polyurethane resin of the paint for the lower layer used in Example 6 was changed to sodium sulfonate.

[Experimental Data]

For the disks prepared in Examples and Comparative Examples, the following items were measured.

(1) Dispersion Gloss of Lower Layer (degree of gloss of surface of a magnetic coated film which was prepared by coating dispersed magnetic paint on PET film by a small applicator)

(2) Surface Roughness (Ra) of Medium

Upper monolayer uncalendered (a PET film is coated with only a magnetic paint for an upper layer so as to give a dry film thickness of 0.3 μm, and after drying, the surface roughness of an uncalendered magnetic layer is measured.)

Lower monolayer uncalendered (a PET film is coated with only a non-magnetic paint for a lower layer so as to give a dry film thickness of 1.5 μm, and after drying, the surface roughness of an uncalendered non-magnetic layer is measured.)

Multiple layers uncalendered (in the magnetic disk preparing method shown in Example 1, the surface roughness of coated films coated in multiple layers before treatment is measured.)

Multiple layer treatment (the surface roughness of a magnetic disk obtained by the magnetic disk preparing method shown in Example 1 is measured.)

(3) Electromagnetic Characteristics (4) Durability

TABLE 1

| | | Examples | | | | | | | | |
|---|---|---|---|---|---|---|---|---|---|---|
| | | E. 1 | E. 2 | E. 3 | E. 4 | E. 5 | E. 6 | E. 7 | E. 8 | E. 9 |
| Dispersion Gloss of Lower Layer | | 138 | 130 | 129 | 128 | 130 | 130 | 127 | 130 | 130 |
| Surface Roughness Ra (nm) | Upper Monolayer Uncalendered | 17 | 17 | 17 | 17 | 17 | 20 | 17 | 17 | 17 |
| | Lower Monolayer Unclaendered | 13 | 17 | 18 | 18 | 17 | 17 | 19 | 16 | 16 |
| | Multiple Layers Uncalendered | 14 | 15 | 16 | 16 | 15 | 16 | 17 | 15 | 15 |
| | Multiple Layers Calendered | 4.9 | 5.2 | 5.5 | 5.3 | 5.3 | 5.2 | 5.9 | 5.0 | 4.6 |
| Output (%) | Low Frequency (1 MHz) | 100 | 100 | 102 | 102 | 101 | 95 | 100 | 101 | 100 |
| | High Frequency (4.5 MHz) | 105 | 105 | 100 | 100 | 104 | 102 | 98 | 104 | 107 |
| Durability (hr) | | 1700 | 2000 | 1900 | 1900 | 2000 | 2000 | 1700 | 1800 | 1200 |

E.: Example

TABLE 2

| | | Comparative Examples | | | | | | | | | | |
|---|---|---|---|---|---|---|---|---|---|---|---|---|
| | | C. E. 1 | C. E. 2 | C. E. 3 | C. E. 4 | C. E. 5 | C. E. 6 | C. E. 7 | C. E. 8 | C. E. 9 | C. E. 10 | C. E. 11 |
| Dispersion Gloss of Lower Layer | | 130 | 110 | 125 | 95 | 115 | 116 | 118 | 108 | 110 | 115 | 118 |
| Surface Roughness Ra (nm) | Upper Monolayer Uncalendered | 17 | 17 | 17 | 17 | 17 | 17 | 17 | 17 | 17 | 20 | 20 |
| | Lower Monolayer Uncalendered | 23 | 26 | 20 | 28 | 22 | 21 | 21 | 23 | 23 | 22 | 21 |
| | Multiple Layers Uncalendered | 25 | 30 | 22 | 32 | 23 | 22 | 23 | 25 | 27 | 24 | 25 |
| | Multiple Layers Calendered | 8.6 | 10.5 | 6.5 | 11.5 | 7.6 | 7.1 | 7.8 | 8.5 | 8.9 | 7.2 | 7.5 |
| Output (%) | Low Frequency (1 MHz) | 95 | 90 | 100 | 90 | 98 | 100 | 99 | 95 | 95 | 95 | 95 |
| | High Frequency (4.5 MHz) | 89 | 85 | 97 | 84 | 92 | 93 | 90 | 89 | 86 | 89 | 88 |
| Durability (hr) | | 500 | 600 | 600 | 500 | 900 | 700 | 900 | 500 | 400 | 800 | 800 |

C.E.: Comparative Example

<Measuring Methods>

Electromagnetic Characteristics

Measured at a rotational speed of 2940 rpm, using a GUZIK electromagnetic characteristic measuring instrument.

Measured values were determined, taking the output of a drive maker's reference disk as 100%.

Durability

A disk was inserted into a ZIP drive rotating at a rotational speed of 3000 rpm, and a head was randomly sought in the environment shown in FIG. 1 indicated below. The presence or absence of a scratch was visually confirmed. The test was terminated at the time when a scratch was formed.

<Measuring Method of Surface Roughness)

Measuring instrument: Talystep system manufactured by Tailor-Hobson Co.

Measuring conditions: filter conditions 0.18 Hz to 9 Hz

Tracer: a 0.1×2.5 µm special stylus

Tracer pressure: 2 mg

Measuring speed: 0.03 mm/second

Measuring length: 500 µm

<Measuring Method of Gloss>

Measuring instrument: a GM-3D gloss meter manufactured by Murakami Color Research Laboratory (incident angle—reflection angle: 60°—60°)

According to the present invention, the magnetic recording media can be obtained which are excellent in dispersibility of the lower layers, small in surface roughness (Ra) after multiple layer treatment, namely excellent in surface properties, good in electromagnetic characteristics and excellent in durability.

What is claimed is:

1. A magnetic recording medium comprising a non-magnetic support and a magnetic layer formed thereon through a non-magnetic layer, in which said non-magnetic layer contains, as binders, a vinyl chloride resin having carboxylic acid and amine polar groups in one molecule and a polyurethane resin having phosphobetaine and/or phosphamine as a polar group.

2. The magnetic recording medium according to claim 1, in which the non-magnetic layer contains granular $\alpha$-$Fe_2O_3$ and carbon black having a BET of 60 $m^2$/g to 250 $m^2$/g and a DBP oil absorption of 40 ml/100 g to 150 ml/100 g as pigments.

3. The magnetic recording medium according to claim 1, in which the non-magnetic layer contains granular $\alpha$-$Fe_2O_3$, $\alpha$-$Al_2O_3$ and carbon black having a BET of 60 $m^2$/g to 250 $m^2$/g and a DBP oil absorption of 40 ml/100 g to 150 ml/100 g as pigments.

4. The magnetic recording medium according to claim 1, in which a magnetic powder contained in the magnetic layer is a magnetic metal powder or a hexagonal ferromagnetic powder.

5. The magnetic recording medium according to claim 1, in which the average thickness of the magnetic layer is 1.0 µm or less, and the average thickness of the non-magnetic layer is 1 µm to 3 µm.

6. The magnetic recording medium according to claim 1 or 5, in which the non-magnetic layer is formed, and the magnetic layer is formed thereon in multiple layers simultaneously or successively while the non-magnetic layer is still in a wet state.

* * * * *